United States Patent [19]

Hopkins

[11] Patent Number: 4,592,558
[45] Date of Patent: Jun. 3, 1986

[54] SPRING RING AND HAT RING SEAL

[75] Inventor: John F. Hopkins, Westminster, Colo.

[73] Assignee: Hydril Company, Houston, Tex.

[21] Appl. No.: 661,687

[22] Filed: Oct. 17, 1984

[51] Int. Cl.⁴ .............................................. F16J 15/24
[52] U.S. Cl. .................................... 277/205; 277/124;
  277/166; 277/188 R; 277/198
[58] Field of Search ............... 277/164, 124, 166, 205,
  277/206 R, 206 A, 214, 212 R, 212 C, 212 F,
  212 FB, 188 R, 188 A, 165, 227–229, 234,
  167.5, 198; 285/110, 111

[56] References Cited

U.S. PATENT DOCUMENTS

| | | | |
|---|---|---|---|
| 368,189 | 8/1887 | Carter | 277/198 |
| 1,757,724 | 5/1930 | Larson | 277/188 R X |
| 2,273,129 | 2/1942 | Messinger | 277/188 R X |
| 2,366,161 | 1/1945 | Tweedale | 277/206 R |
| 2,417,828 | 3/1947 | Joy | 277/188 R X |
| 2,733,969 | 2/1956 | Polk | 277/188 A |
| 2,815,973 | 12/1957 | Jackson | 277/188 A |
| 2,927,830 | 3/1960 | Workman | 277/205 X |
| 2,934,363 | 4/1960 | Knox | 277/188 A X |
| 3,561,776 | 2/1971 | Wilson | 277/206 R |
| 3,901,517 | 8/1975 | Heathcott | 277/227 X |
| 4,089,533 | 5/1978 | Knudson | 277/206 R X |
| 4,103,909 | 8/1978 | Hoffman et al. | 277/205 X |
| 4,190,259 | 2/1980 | Zitting | 277/165 |
| 4,281,590 | 8/1981 | Weaver | 277/188 A X |
| 4,285,525 | 8/1981 | Held | 277/166 X |
| 4,300,776 | 11/1981 | Taubenmann | 277/124 |
| 4,352,499 | 10/1982 | Foster | 277/124 X |

FOREIGN PATENT DOCUMENTS

| | | | |
|---|---|---|---|
| 576594 | 5/1959 | Canada | 277/188 R |
| 40899 | 10/1887 | Fed. Rep. of Germany | 277/205 |
| 432755 | 8/1926 | Fed. Rep. of Germany | 277/188 R |
| 494971 | 3/1930 | Fed. Rep. of Germany | 277/188 R |
| 653626 | 11/1937 | Fed. Rep. of Germany | 277/205 |
| 719479 | 4/1942 | Fed. Rep. of Germany | 277/205 |
| 871236 | 3/1953 | Fed. Rep. of Germany | 277/206 A |
| 711125 | 6/1931 | France | 277/205 |
| 923196 | 2/1947 | France | 277/167.5 |
| 985295 | 3/1951 | France | 277/205 |
| 1146909 | 5/1957 | France | 277/188 R |
| 1166648 | 6/1958 | France | 277/165 |
| 111346 | 11/1917 | United Kingdom | 277/205 |
| 561321 | 5/1944 | United Kingdom | 277/205 |
| 647149 | 12/1950 | United Kingdom | 277/188 R |
| 708521 | 5/1954 | United Kingdom | 285/111 |

OTHER PUBLICATIONS

"Polydyne Spectraseal" (pamphlet), published by Microdot/Polydyne, 6 pages.
"Spring-Ring Seal SR Series" (pamphlet), published by Fluorocarbon Mechanical Seal Division, 4 pages.
"American Variseal Corp.—Catalog No. AV983", published by American Variseal Corp. (1983), 24 pages.

Primary Examiner—Robert S. Ward
Attorney, Agent, or Firm—Vaden, Eickenroht, Thompson & Jamison

[57] ABSTRACT

A ring seal comprising a main body member having a U-shape cup recess opening on one side, usually having a U-shape metal spring located therein, and a hat ring with a solid projection fitting into the U-shape cup recess opening and having its opposite face being flat and normal to the ring axis. A back up ring adjacent the heel of the main body ring can be provided. An assembly of such ring seals can be stacked heel-to-heel; hat-ring-to-hat-ring or heel-to-hat-ring.

13 Claims, 6 Drawing Figures

SPRING RING AND HAT RING SEAL

BACKGROUND OF THE INVENTION

1. Field of the Invention

This invention pertains to ring seals and more particularly to improvements in ring seals having a U-shaped recess cup opening in at least one side usually accommodating a similarly shaped spring.

2. Description of the Prior Art

Ring seals are employed in a wide range of designs for applications with rods, pistons and the like and in numerous additional custom configurations for use in static, reciprocating and rotary applications. A popular ring seal for premium applications is known as a spring energized polymeric ring seal. Generally, such a seal comprises a main body member made of a suitable polymeric material, such as a PTFE blend, configured so as to have a U-shape or channel recess that opens on one or both sides. The seal is "energized" by one or more suitable spring elements accommodated and conforming to the configuration of the recess. A usual material for such spring elements is stainless steel. Preferably, the spring is formed in a U-shape to provide cantilever beam action to the seal.

A ring seal is usually located within a suitable gland, usually metal, that limits its radial expansion. It may be pressured against such a gland or other axial limiting surface when in use. Seals of the type described have been employed in temperatures ranging from −475° F. to +700° F. and in pressure conditions up to 30,000 psi. Such seals are used in liquid and gas conditions and are often used where the conditions are also environmentally corrosive.

Although the ring seals just described are very useful, use in pressurized/depressurized and other types of variable conditions have caused the materials to prematurely age. Aging is caused by creep and seal extension. Further, in the high end of the pressure range, roughly between 14,000 and 30,000 psi, the high pressures tend to crush the lips of the openings.

Attempts to prevent such premature failures have included the use of stacking or the use of a back up ring to protect the open side of the U-shape cup recess opening. Stacking obviously does not protect the first ring seal, since it will be open to the pressure. When aligned face-to-face, the lips of the openings crush against each other. Even a back-up ring pushed back into the lips of a U-shape cup recess opening can cause crushing of the lips of the opening.

It should be mentioned that the "heel" of the body of the ring, i.e., the side of the ring opposite the open side, is generally a thick wall portion with a flat side normal to the axis of the ring and is provided to operate in the existing high pressure conditions and to stabilize the ring in the gland. Because of the structure of the heel, it is not possible to stack adjacent ring seals, in the same manner as with V-shaped seals where the thickness of the seals are of uniform dimension.

Therefore, it is a feature of the present invention to provide a ring seal structure including a suitable hat ring having a solid projection on one side for conforming with the U-shape cup or channel recess of the main body member of the seal.

It is another feature of the present invention to provide a ring seal assembly including the stacking of at least two sets of ring seal main body and hat ring combinations.

It is still another feature of the present invention to provide a stack assembly including a plurality of ring seals, i.e., main body and hat ring combinations, that can be stacked heel-to-heel, hat-ring-to-hat-ring, or heel-to-hat-ring.

It is yet another feature of the present invention to provide a stack assembly including combinations of ring seal main body rings, hat rings and back-up rings.

SUMMARY OF THE INVENTION

A ring seal includes as one preferred part a main body member, which is typically substantially the same as previously been referred to in the prior art as a spring energized polymeric ring seal. Such a main body member has a flat-faced heel perpendicular to the ring axis on one side and a U-shape cup or channel recess opening on the other side for holding therein a similarly shaped metal spring. A hat ring having a flat-faced side perpendicular to the ring axis on one side and a solid projection on the other side is used to mate with the U-shape cup side of the main body. The width of the hat ring, which is the difference in the external and internal radii, is slightly larger than the adjacent side of the main body when the seal is subjected to pressure. A back-up ring with a width slightly larger than the heel width may also be provided.

A plurality of main-body-and-hat-ring combinations, with or without back-up rings, can be stacked in one of three ways: heel-to-heel; hat-ring-to-hat-ring; or heel-to-hat-ring.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the Drawings.

DESCRIPTION OF THE PREFERRED EMBODIMENTS

Figure 1:
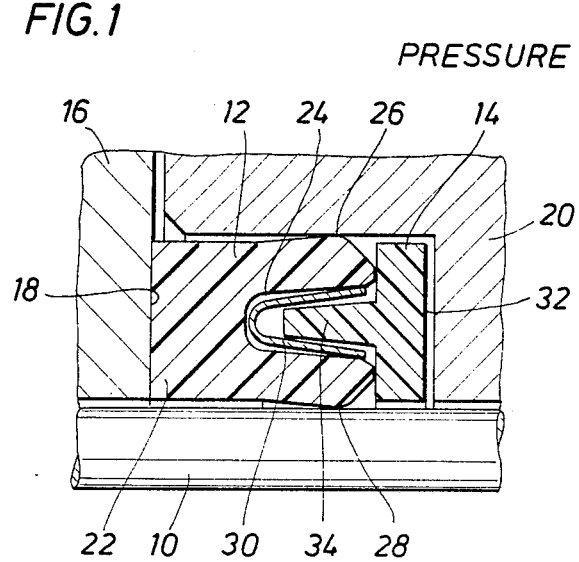
FIG. 1 is a cross-sectional view of a segment of a preferred ring seal structure in accordance with the present invention showing a main body member and a hat ring.

Now referring to the drawings and first to FIG. 1, a ring seal in accordance with the present invention is shown in application with sealing a rod 10. The ring seal comprises a main body member 12 and a hat ring 14 to be described more fully hereinafter and is enclosed within a gland comprising a first portion 16 presenting a face 18 which is normal to the axis of the ring and an L-shaped member 20 enclosing the ring seal structure. In the embodiment shown, fluid pressure is being applied from the right side of the drawing.

Main body member 12 of the ring seal, which forms a continuous ring about a central axis, includes heel portion 22 and a U-cup or channel recess portion 24. The heel portion, which is on the left side of the structure illustrated and bears against face 18, may be of a thickness over a wide range of dimensions, depending upon the application; however, it has a face parallel to gland face 18 which is normal to the axis of the ring and is for the primary purpose of maintaining stability of the ring seal within the gland. The ring seal main body is normally made of a polymeric material, typically a PTFE blend.

Near the opening of the U-shape cup recess, one or both of the lips of the opening enlarges so that the outside raidal dimension is largest at external ridge 26 and is at its least raidal dimension at internal ridge 28. The ridging can be a complex structure and does not have to be included at each location, depending upon the specific structure of the main body member. That is, such enlargement may be only on one side and not necessarily on both.

Enclosed within the U-shaped cup recess just described, a metal spring 30 is secured and generally conforms or is accommodated by the internal shape of the recess. The spring structure may be either continuous or segmented but it preferably provides cantilever beam action to the overall ring seal.

The outward lips of the ring seal may taper as shown in FIG. 1 or may be blended or may take other configurations, as desired.

Hat ring 14 has flat-faced outside surface 32 which is normal to the ring axis. The inside surface at ring 14 includes a projection 34 that fits into the opening of the U-shaped cup recess and spring that has just been described.

When the ring seal is placed under pressure, the fluid medium, which may be either gas or liquid, causes the deepest portion of the ring seal to spread slightly and thereby causes the lips to come together slightly. The radial dimension of hat ring 14 is sized to be slightly larger than the comparable radial dimension of the main body when the assembly is under pressure.

As shown in FIG. 1, the material of hat ring 14 is the same polymeric material, or possibly a different polymeric material, from that of the main body member.

Figure 2:
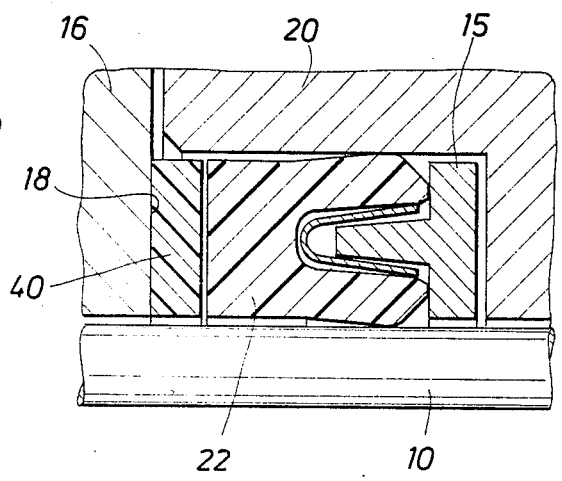
FIG. 2 is a cross-sectional view of a segment of a preferred ring seal structure in accordance with the present invention showing a main body member, a hat ring and a back-up ring.

Now referring to FIG. 2, the structure of the ring seal is the same as with respect to FIG. 1, except in two particulars. The hat ring 14a is shown as a metal, preferrably stainless steel, instead of a polymeric material. Under extremely high pressure conditions, it may be preferred to include such a stainless steel hat ring to provide stability to the overall structure. In addition, back-up ring 40 is shown between heel 22 and face 18 of gland member 16. The radial dimension or width of back-up ring 40 is slightly larger than the comparable adjacent width of heel 22 to prevent peeling of the heel that might occur without such a back-up ring.

Figure 3:
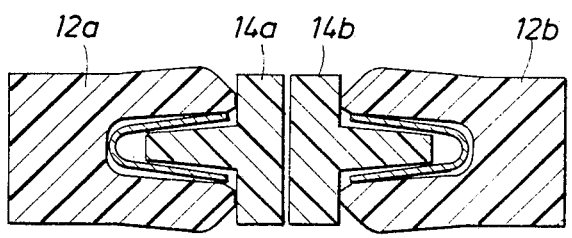
FIG. 3 is a cross-sectional view of a segment of a preferred seal ring assembly, illustrating two ring seals stocked hat-ring-to-hat-ring.

Now referring to FIG. 3, two ring seal structures similar to the ring seal structure shown in FIG. 1, is shown in a stacked configuration to provide an overall combination or assembly. Main body 12a is shown with hat ring 14a and main body 12b is shown in combination with hat ring 14b. The flat faced portions of each of the hat rings are shown adjacent one another in hat-to-hat alignment.

Figure 4:
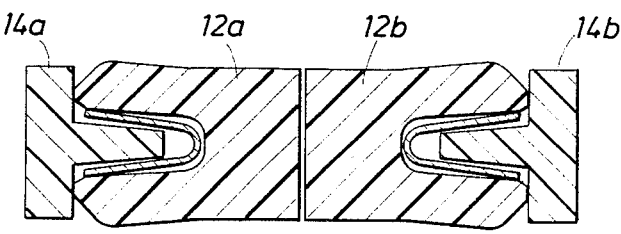
FIG. 4 is a cross-sectional view of a segment of a preferred ring seal assembly, illustrating two ring seals stocked heel-to-heel.

FIG. 4 shows the same two ring seal combinations as shown in FIG. 3 although this time aligned in heel-to-heel-type stacking.

Figure 5:
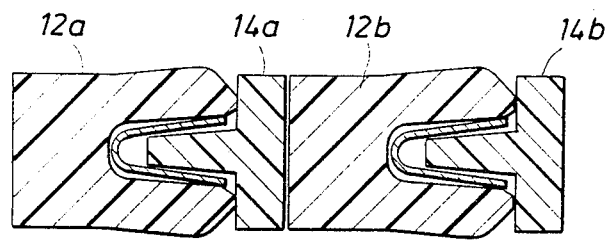
FIG. 5 is a cross-sectional view of a segment of a preferred ring seal assembly, illustrating two ring seals stacked heel-to-hat-ring.

A third stacking alignment is illustrated in FIG. 5. In this configuration, hat ring 14a of the first ring seal is shown contiguous with the heel of main body 12b, which places this structure in heel-to-hat-ring alignment.

It is permissible and sometimes desirable to include one or more backup rings, such as illustrated in FIG. 2, in stacking the individual ring seals together in any of the three possible respective ways illustrated in FIGS. 3, 4 and 5.

Figure 6:
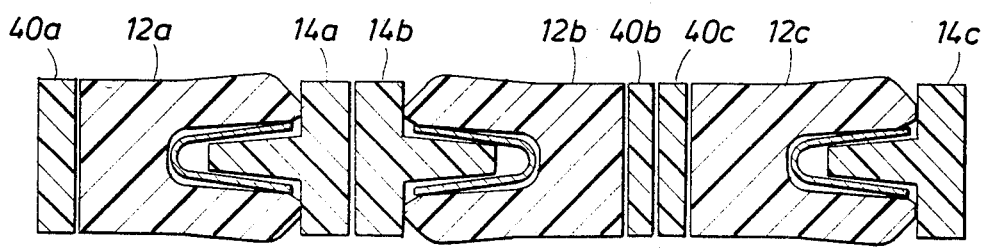
FIG. 6 is a cross-sectional view of a ring seal assembly, illustrating the use of back-up rings and including more than two ring seals.

Now referring to FIG. 6, stacking of three individual seal rings are shown. Further, each of the individual seal rings includes a back-up ring. Hence, progressing from left to right, the structure includes back-up ring 40a, main body member 12a, hat ring 14a hat ring 14b, main body member 12b, back-up ring 40b, back-up ring 40c, main body member 12c, and hat ring 14c.

It has been observed that the use of the hat rings drastically reduces unwanted aging caused by flow of the material of the main body portion, which would ordinarily occur. In use, the ring is prevented from collapsing or crushing when loaded either with forward pressure or back pressure. Furthermore, such loading does not peel either the heel or extrude the lips, since the back-up ring and the hat ring are slightly larger than the main body portion with which they operate when the entire assembly is under pressure. The stacking configurations which have been described provide the various alternatives necessary to meet customer preference. Generally, if the working environment anticipates sudden changes in direction of the pressure, the head-to-head configuration is desired. In a dynamic, ever-changing pressurizing and release from pressure situation, but one that is predominantly from one direction, back-to-back configuration is generally preferred. Finally, when the seals are placed under extreme pressure, the heel-to-hat-ring alignment is generally desired. In such cases, one seal may fail as a seal but remain in place sufficiently to protect the second seal from non-failure and therefore this seal is still activated as a seal.

While several particular embodiments of the invention have been shown, it will be understood that the invention is not limited thereto. Many modifications may be made and will become apparent to those skilled in the art. For example, in FIG. 3, hat rings 14a and 14b are shown as being two separate pieces. The same structural advantage is obtained if instead the two rings were made in one piece, having a rounded projection both to the left and to the right. Therefore, if it is anticipated that this stacking arrangement is the desired one, or if hat-to-hat alignment is to be made in a more complex stacking arrangement, as shown for example in FIG. 6, the use of such a solitary piece in substitution of pieces 14a and 14b can be employed.

What is claimed is:

1. A ring seal comprising
   a main body ring having a U-shape cup recess on at least one side, thereby defining legs about said recess, said recess having a round internal surface, the opening of said recess being from a direction parallel to its axis, and
   a hat ring with a solid ring projection portion on at least one side for fitting into said recess of said main body ring, the end of said projection portion presenting a corner for engaging at least one leg for allowing the outward portion of said engaged leg to flex inwardly to conform to said projection portion, thereby limiting the inward collapse of said recess.

2. A ring seal in accordance with claim 1, and including a spring within said recess of said main body and conforming therewith, the outward portion thereof flexing inwardly with said engaged leg against said corner of said projection portion of said hat ring.

3. A ring seal in accordance with claim 2, wherein the external surface dimension of said main body radially outward of said opening is larger than the radial outward dimension of the heel of said main body ring.

4. A ring seal in accordance with claim 3, wherein the width of said hat ring is slightly larger than the width of the side of said main body ring when said seal is subjected to operating pressure.

5. A ring seal in accordance with claim 2, wherein the internal surface dimension of said main body ring radially inward of said opening is smaller than the radial inward dimension of the heel of said main body ring.

6. A ring seal in accordance with claim 5, wherein the width of said hat ring is slightly larger than the width of the side of said main body ring when said seal is subjected to operating pressure.

7. A ring seal in accordance with claim 1, wherein said main body ring is made of polymeric material.

8. A ring seal in accordance with claim 7, wherein said hat ring is made of polymeric material.

9. A ring seal in accordance with claim 7, wherein said hat ring is made of stainless steel.

10. A hat ring for accommodating with a ring seal main body having a U-shape recess opening on at least one side, thereby defining legs about said recess, said recess having a rounded internal surface, said hat ring having a solid ring projection portion, the end of said projection portion presenting a corner for engaging at least one leg for allowing the outward portion of said engaged leg to flex inwardly to conform to said projection portion, thereby limiting the inward collapse of said recess.

11. A hat ring in accordance with claim 10, having a width that is slightly larger than the width of the side of said main body while under operating pressure.

12. A hat ring in accordance with claim 10 made of polymeric material.

13. A hat ring in accordance with claim 10 made of stainless steel.

* * * * *